United States Defensive Publication [19] (H) [11] T990,002

Stoesser [43] Jan. 1, 1980

[54] ACTUATOR FOR DISPENSING APPARATUS

[76] Inventor: P. Richard Stoesser, 1201 Evamar Dr., Midland, Mich. 48640

[21] Appl. No.: 47,405

[22] Filed: Jun. 11, 1979

[51] Int. Cl.[2] ..... B05B 9/043

[52] U.S. Cl. ..... 222/323; 222/383

[57] ABSTRACT

An improved actuator for a liquid-dispensing apparatus of the type including a container for receiving liquids and a manually operated dispensing pump detachably connected to a container. The actuator comprises a rigid member having a lower end pivotally connected to the container but not integrally formed therewith and an upper end pivotally connected to the piston mechanism of the dispensing pump. The actuator is adapted to be operated by all the fingers of the hand holding the apparatus, thereby reducing user fatique.

2 Claims, 1 Sheet Drawing,

6 Pages Specification

The file of this unexamined application may be inspected and copies thereof may be purchased (849 O.G. 1221, Apr. 9, 1968).

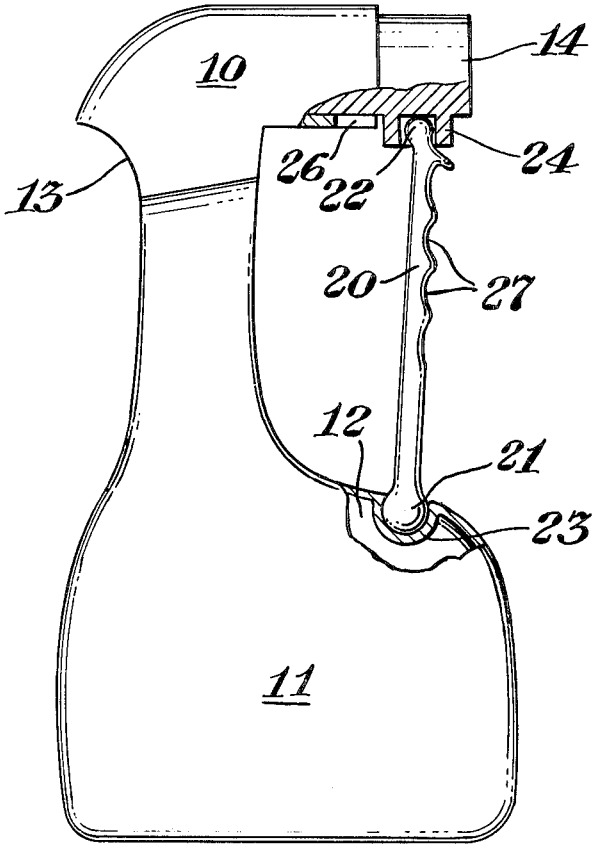

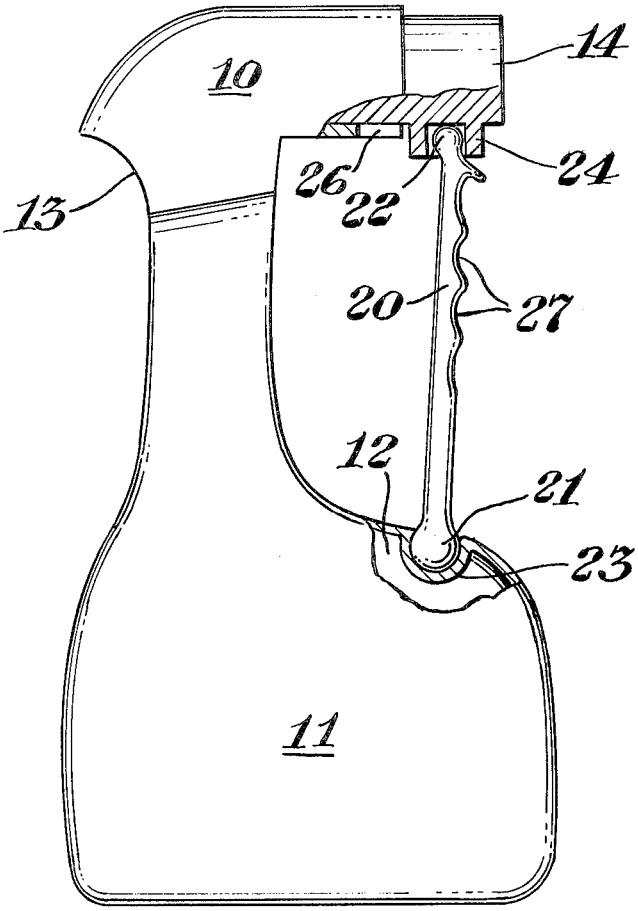
10
14
24
26
22
13
20
27
12
21
23
11